US006210472B1

(12) United States Patent
Kwan et al.

(10) Patent No.: US 6,210,472 B1
(45) Date of Patent: Apr. 3, 2001

(54) TRANSPARENT COATING FOR LASER MARKING

(75) Inventors: Wing Sum Vincent Kwan, Deerfield; Yoshikazu Mizobuchi, Mundelein, both of IL (US)

(73) Assignee: Marconi Data Systems Inc., Wood Dale, IL (US)

( * ) Notice: Subject to any disclaimer, the term of this patent is extended or adjusted under 35 U.S.C. 154(b) by 0 days.

(21) Appl. No.: 09/288,017

(22) Filed: Apr. 8, 1999

(51) Int. Cl.$^7$ .................................................. C09D 11/00
(52) U.S. Cl. .................................. 106/31.14; 106/31.24; 106/31.31; 106/31.64; 427/372.2
(58) Field of Search ........................... 106/31.14, 31.24, 106/31.32, 31.64; 427/372.2

(56) References Cited

U.S. PATENT DOCUMENTS

| 3,161,770 | 12/1964 | Huett et al. . |
| 4,571,416 | 2/1986 | Jarzombek et al. . |
| 4,605,686 | 8/1986 | Obana . |
| 4,680,332 | 7/1987 | Hair et al. . |
| 4,861,620 | 8/1989 | Azuma et al. . |
| 4,880,465 | 11/1989 | Loria et al. . |
| 4,980,390 | 12/1990 | Shorr et al. . |
| 5,472,930 | 12/1995 | Podszum et al. . |
| 5,486,550 | 1/1996 | Lubas . |
| 5,711,791 | 1/1998 | Croker et al. . |
| 5,760,120 | 6/1998 | Itoh et al. . |
| 5,830,929 | 11/1998 | Stramel . |
| 5,897,938 | 4/1999 | Shinmoto et al. . |

FOREIGN PATENT DOCUMENTS

| 44 07 905 | 9/1995 | (DE) . |
| 19652253 | 6/1998 | (DE) . |
| 0 078 365 | 5/1983 | (EP) . |
| 0 611 662 | 8/1994 | (EP) . |
| 0 739 933 | 10/1996 | (EP) . |
| 2 291 719 | 1/1996 | (GB) . |
| 63-172689 | 7/1988 | (JP) . |
| 9-156228 | 6/1997 | (JP) . |

OTHER PUBLICATIONS

"Laser–sensitive Pigmente im Kunststoff", *Austropak*, pp. 10–12 (1997).

Translation of AJ ("Laser–sensitive Pigments im Kunstst'off", *Austropak*, pp. 10–12 (1997)).

*Primary Examiner*—Helene Klemanski
*Assistant Examiner*—Veronica F. Faison
(74) *Attorney, Agent, or Firm*—Leydig, Voit & Mayer, Ltd.

(57) ABSTRACT

The present invention provides a transparent coating comprising a resin and a heat responsive material that increases in opacity when exposed to heat. Preferably, the transparent coating is free or substantially free of a pigment or dye. An example of a heat responsive material is a carbohydrate. The present invention further provides a coating composition comprising a solvent, a resin, and a heat responsive material that increases in opacity when exposed to heat. The present invention further provides a method for creating a mark on a substrate comprising providing to the substrate the transparent coating to obtain a coated substrate and exposing a selected area of the coated substrate to heat to create the mark. The substrates can be marked with a laser.

39 Claims, 1 Drawing Sheet

(1 of 1 Drawing Sheet(s) Filed in Color)

TRANSPARENT COATING FOR LASER MARKING

FIELD OF THE INVENTION

The present invention relates to a transparent coating that increases in opacity when exposed to heat. The coating allows high speed marking of substrates by the use of a laser.

BACKGROUND OF THE INVENTION

Laser technology has received considerable attention from the industry as a means to produce permanent markings on various substrates. Presently, laser technology makes use of a focused energy source to "burn off" some of the surface material to produce an image. Carbon dioxide lasers, with a wavelength in the infrared region, are commonly used for this application.

There are at times advantages in using the laser marking technology over other marking technologies, e.g., ink jet printing technology. For example, the maintenance of a laser equipment may be easier and more economical in certain circumstances than the maintenance of other types of markers. For examples, since laser technology does not depend on using a liquid ink jet to produce an image, laser technology is less prone to printing problems caused by ink. In addition, the laser technology allows marking of substrates at extremely high speeds. An example of the use of the technology is in the marking of expiration dates on plastic soda bottles. The rate of movement of the conveyor belt carrying the soda bottles in this application ranges from 100 to 300 feet per minute, and it can be as high as 500 feet per minute.

Although laser technology has several advantages, substrates suitable for laser marking are presently limited. For example, it is difficult to mark metals and white or corrugated papers. The metal surface or the white paper surface is too reflective for the laser energy to be converted to thermal energy which is needed to create a mark. In the case of corrugated paper, the laser tends to damage the surface. Thus, there exists a need for substrates or substrate surfaces that are suitable for laser marking.

There have been reports on a coating which is writable by laser. An example is given in DE 19652253-A1. A disadvantage of this coating is that it helps to produce only white markings on a colored substrate or background. In actual practice, it will be more desirable to have markings of brown or black over a white or colorless background. Thus, there exists a need for a substrate or surface that is suitable for creating brown or black markings on a white or colorless background.

These objects and advantages of the present invention, as well as additional inventive features, will be apparent from the description of the invention provided herein.

BRIEF DESCRIPTION OF THE DRAWING

The file of this patent contains at least one drawing executed in color. Copies of this patent with color drawing(s) will be provided by the Patent and Trademark Office upon request and payment of the necessary fee.

BRIEF SUMMARY OF THE INVENTION

Figure 1:
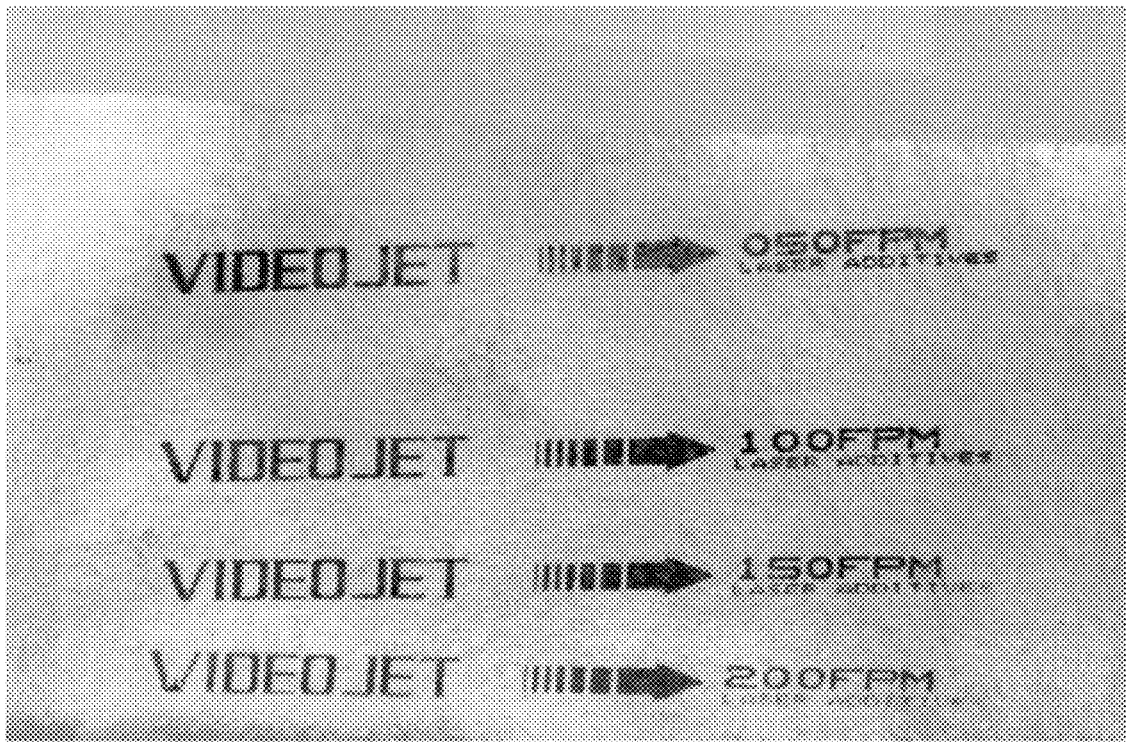
FIG. 1 depicts laser markings produced on a coated cardboard substrate according to an embodiment of the present invention. The speed of marking is indicated next to the arrows. See Example 8 for additional details.

The foregoing needs have been fulfilled to a great extent by the present invention which provides a transparent coating comprising a resin and a heat responsive material that increases in opacity when exposed to heat. Preferably, the transparent coating is free or substantially free of a colorant such as a pigment or dye. The increase in opacity is irreversible.

The present invention further provides a coating composition comprising a solvent, a resin, and a heat responsive material that increases in opacity when exposed to heat. The coating composition is preferably transparent. The present invention further provides a method for creating a mark on a substrate comprising preparing a coated substrate having the transparent coating and exposing to heat a selected area of the coated substrate. The heat can be provided by a laser.

While the invention has been described and disclosed below in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

The present invention relies on the characteristic that certain materials darken and become more opaque irreversibly when exposed to heat. Accordingly, the present invention provides a transparent coating comprising a resin and a heat responsive material that increases in opacity when exposed to heat. Preferably, the transparent coating is free or substantially free of a colorant such as a pigment or dye.

The heat responsive material becomes colored as a result of a chemical reaction that occurs when exposed to heat. The chemical reaction can be any reaction known to those skilled in the art. For example, the chemical reaction can include oxidation, reduction, and/or decomposition. A preferred chemical reaction is decomposition. It is further preferred that the heat responsive material becomes brown or black when exposed to heat. It is further preferred that the decomposition is anaerobic or partially anaerobic. In certain embodiments, e.g., where a carbohydrate such as sugar is used as the heat responsive material, the decomposition of the material is often associated with a physical change, e.g., melting.

Any suitable heat responsive material that undergoes a chemical reaction, e.g., a material that undergoes a reaction below a temperature of about 300° C., typically at a temperature of from about 50° C. to about 250° C., preferably at a temperature of from about 80° C. to about 250° C., and more preferably at a temperature of from about 100° C. to about 170° C., can be used. Generally, the temperature at which the chemical reaction starts is the darkening temperature of the coating. The darkening temperature should not be too low or too high. If the darkening temperature is too low, the coating may darken prematurely. If the darkening temperature is too high, the quantity of heat supplied to create a mark would be excessively high, e.g., the time of laser irradiation would be too high. Alternatively, the laser marking speed would be too low.

The heat responsive material can be a compound of low molecular weight or a polymer of higher molecular weight. A preferred material is a carbohydrate. An example of a carbohydrate is a saccharide. The saccharide can be a mono, di-, tri-, and/or a higher saccharide such as a polysaccharide. Mono and disaccharides, particularly sugars, are preferred. The sugar can be in any isomeric form. Thus, D and L forms, as well as mixtures thereof, can be used. L form sugars are also referred to as invert sugars. These are found in many fruit juices. Derivatives of sugars can also be used. Examples of suitable sugars include fructose, glucose, sucrose, galactose, and maltose. Examples of sugar derivatives include mannitol, sorbitol, xylitol, glucose phosphates, gluconolactone, and glucosamines. Apart from the purified sugars, sugar containing natural products can also be used. Thus, honey and fruit juices, e.g., lemon juice, orange juice, and pineapple juice, can be used.

The transparent coating of the present invention includes a resin. It is preferred that the resins are film formers. The resin can be organic or inorganic. The resin can be water, solvent, or oil soluble or dispersible. A water soluble resin is preferred relative to a solvent soluble resin in view of environmental concerns. Examples of suitable water soluble resins include silicate resins, acrylic resins, anionic resins, and cationic resins. Preferred examples of resins include sodium silicate, e.g., SILICATE STAR™ from PG Corporation, Forge Valley, Pa., polyacrylic acid or a salt thereof, copolymers comprising acrylic acid, e.g., JON-CRYL™ resins from S.C. Johnson & Son, Inc., Racine, Wis., polyurethanes, e.g., the water soluble polyurethane, FLEXTHANE™ 620 from Air Product and Chemical Co., Allentown, Pa., polystyrene sulfonate (Aldrich Chemical Company, Milwaukee, Wis.), and polyallylammonium chloride (Aldrich Chemical Company). Neutral resins also can be used. Examples of suitable resins include melamine formaldehyde, urea formaldehyde, polyureas, polyamines, polyvinylalcohol (PVA), water soluble siloxanes, polyvinylpyrrolidone (PVP), copolymers of vinylpyrrolidone and vinylacetate, alkyl cellulose, cellulose ethers, cellulose acetate, and cellulose nitrate. Derivatives of resins that have been rendered water soluble by providing water soluble or hydrophilic groups also can be used. Natural resins such as starch, gum arabic, and pectin also can be used. Water soluble resins are suitable for water-flexography. Resins that are not water soluble but are soluble in a mixed solvent containing water can also be used.

The transparent coating of the present invention is free or substantially free of a colorant. In certain embodiments, a small quantity of colorants such as pigments, dyes, or fluorescent or optical brighteners can be included without detracting from the purpose of this invention.

The transparent coating can be applied to a given substrate by methods known those skilled in the art, e.g., by using conventional printing technology such as silk-screen printing, flexography, offset printing, dip coating, wire-bar coating, or spray coating. Thus, the resin and the heat responsive material can be dissolved or dispersed in a suitable solvent, and the resulting coating composition can be applied to the substrate. Accordingly, the present invention provides a coating composition comprising a carrier, a resin, and a heat responsive material that increases in opacity when exposed to heat. The coating composition is free or substantially free of a colorant.

Any suitable carrier can be used to prepare the coating composition of the present invention. The carrier can organic or aqueous. Aqueous carriers are preferred for environmental reasons. Thus, water is a preferred carrier.

The coating composition can be prepared by methods known to those skilled in the art. For example, the heat responsive material can be dissolved or dispersed in the carrier, followed by addition of the appropriate resin or resin solution to prepare the coating composition. Thus an aqueous solution of a sugar and an aqueous solution of an acrylic copolymer resin can be combined to prepare the coating composition. To prepare a coating composition containing a solvent, a sugar can be dissolved in a solvent such as alcohol and a solution of a resin such as ethyl cellulose can be added to prepare a coating composition. Ethyl cellulose can be obtained from Dow Chemical Co., Midland, Mich.

The coating composition can be oil-based also. Such systems are useful in offset or letter press printing. The resins employed in these systems are oil-soluble or dispersible. Suitable resins for use in oil-based systems include alkyd resins, e.g., the LV 1830 varnish containing an alkyd resin from Lawter International, Northbrook, Ill. Modified alkyd resins also are useful.

Oil-based coating compositions can be prepared by combining and mixing a solution of a heat responsive material and an oil soluble resin solution. It is preferred that the coating composition is homogeneous. In the preparation of oil-based compositions wherein the heat responsive material is first dissolved in water or other polar solvents, care must be exercised to avoid development of inhomogeneity as the oil phase and the aqueous or organic solution are combined. The heat responsive material solution is preferably added to the oil phase gradually and with good mixing. The addition of the heat responsive material solution is stopped at the point of or just prior to the formation of inhomogeneity. The maximum allowable quantity of the heat responsive material solution added would depend on the type of the oil-based system and/or the heat responsive material. Illustratively, in the case of the oil based system employing the varnish S-100 (Lawter International), up to 33% by weight of a sugar solution can be added before inhomogeneity develops. Stabilizing agents such as surfactants can be used to obtain homogeneous coating compositions containing greater concentrations of the heat responsive material.

The concentration of the heat responsive material in the solution would depend on the solubility of the material. High concentrations are preferred. The concentration can be up to about 90% by weight, typically up to about 80% by weight, and preferably in the range of from about 20% to about 80% by weight, and more preferably in the range of from about 30% to about 80% by weight of the solution. This solution can then be diluted with a resin solution to give a coating composition.

The coating can further include an energy transfer agent. The energy transfer agent serves to improve the conversion to heat of the energy supplied during the marking. Thus, where laser energy is used to create the mark, the energy transfer agent absorbs the laser energy and converts it to heat. The energy transfer agent is typically a solid filler that has a light absorption in the infrared region. The energy transfer agent has a particle size of less than about 10 $\mu$m, preferably from about 0.01 $\mu$m to about 5 $\mu$m. Examples of suitable energy transfer agents include fumed silica such as AEROSIL™ 300, fumed alumina such as ALUMINUMOXID™ C, and a combination thereof such as AEROSIL COK, all available from Degussa Corp. in Ridgefield, N.J. In some cases, the energy transfer agent can also be the resin. In those cases, the need to add another resin is minimized or eliminated.

The transparent coating of the present invention can contain the heat responsive material and the resin in any suitable proportion. The heat responsive material is present typically in an amount of from about 0.1% to about 100%, preferably in an amount of from about 10% to about 90%, and more preferably in an amount of from about 20% to about 80% by weight of the coating. The resin is present typically in an amount of up to about 95%, preferably in an amount of from about 10% to about 90%, and more preferably in an amount of from about 20% to about 80% by weight of the coating. The energy transfer agent can be present typically in an amount of up to about 95%, preferably in an amount of from about 10% to about 90%, and more preferably in an amount of from about 20% to about 80% by weight of the coating.

The present invention further provides a method for creating a mark on a substrate comprising coating the substrate with the transparent coating as described above to obtain a coated substrate and exposing a selected area of the coated substrate to heat to create the mark.

The coated substrates can be marked with any suitable source of heat, preferably with a laser beam. Any suitable laser that can act as a heat source can be used, for example, a $CO_2$ laser and an YAG laser. Substrates to be marked or coded can be advanced at high rates, for example, from about 50 feet/minute to about 500 feet/minute.

The present invention provides a coating composition that can provide thermochromic coating on a variety of substrates. The coating is responsive to low energy lasers and produces black-and-white markings with sufficient contrast ratio.

Transparency can be defined herein as a coating that has a transmittance of greater than 90% of the visible wavelengths. Opacity is defined as a light transmittance of 50% or less. Illustratively, the following experiments were carried out.

A glass slide was coated with a colorless transparent coating composition containing a solution of sodium silicate (37% solids content) and honey in the weight ratio of 1 to 1, to a thickness of 200 $\mu$m. The transmittance of the coated slide was measured and the slide had a transmittance of 98% at 550 nm, which is the midpoint of the visible range of 400–700nm. The glass slide was then heated for 2 minutes at 200° C. The glass slide turned brown after the heat treatment. The transmittance of the heat treated glass slide was 38%.

The transparent coating of the present invention can be applied to a variety of substrates for laser marking. Thus, suitable substrates include ordinary white paper, corrugated paper, metals, plastics, ceramics, glass, wood, and vinyl coated paper.

The transparent coating of the present invention can be suitably protected from environmental damage, abrasion, and wear. For example, the transparent coating of the present invention can be covered by a water or oil resistant coating for increased durability.

The following examples further illustrate the present invention, but of course should not be construed in any way as limiting the scope of the invention.

EXAMPLE 1

This Example illustrates the use of maltose as a heat responsive material. 3.9 grams of maltose (Aldrich Chemical Company, Milwaukee, Wis.) were dissolved in 6.1 grams of deionized water to produce a 39% by weight maltose solution. 5 grams of the maltose solution were then mixed with 5 grams of JONCRYL 70 resin (30% by weight resin content) solution. The resulting coating composition was applied as a coating on an aluminum panel by the use of a film applicator from BYK Gardner, Inc., Silver Spring, Md. The aluminum panel was cleaned with ethanol to remove surface oily residue prior to applying the coating composition. The film thickness was 200 $\mu$m when wet. The panel was allowed to dry overnight under ambient conditions.

The coated substrate prepared as above was heated in an oven at 200° C. for 2 minutes. The optical density of the coated substrate before and after the heating was measured on a Macbeth Model RD 918 densitometer from Macbeth Co., Newsburg, N.Y.

A control coating composition was prepared as above, except that the maltose was omitted. A coated substrate was prepared from the control composition, and subjected to heat treatment at 200° C. for 2 minutes. The optical densities of the substrates were measured before and after the heat treatment. The difference between the results of the two measurements gave a density enhancement factor.

The coated substrate with maltose showed a density enhancement factor of 1.48. The enhancement factor of the control was zero. Since the enhancement factor is measured in logarithmic units, an enhancement factor of 1.48 represents a color intensity difference of a factor of more than 10. This contrast ratio is more than sufficient for the eye to differentiate.

EXAMPLE 2

This Example illustrates the use of fructose as a heat responsive material. An aluminum panel was coated as in Example 1 except that a 60% solution of fructose was used instead of the 39% maltose solution. The coated panel was heated as in Example 1. The enhancement factor was measured, and the result obtained is set forth in Table 1.

EXAMPLE 3

This Example illustrates the use of glucose as a heat responsive material. An aluminum panel was coated as in Example 1 except that a 33% solution of glucose was used instead of the 39% maltose solution. The coated panel was heated as in Example 1. The enhancement factor was measured, and the result obtained is set forth in Table 1.

EXAMPLE 4

This Example illustrates the use of sucrose as a heat responsive material. An aluminum panel was coated as in Example 1 except that a 67% solution of sucrose was used instead of the 39% maltose solution. The coated panel was heated as in Example 1. The enhancement factor was measured, and the result obtained is set forth in Table 1.

EXAMPLE 5

This Example illustrates a method of determining the decomposition temperature of the heat responsive material. Maltose, fructose, glucose, and sucrose were tested on a Differential Scanning Calorimeter (DSC). A DSC 7 instrument from Perkin Elmer Co., Norwalk, Conn., was employed. The sugars were kept under a nitrogen atmosphere during the tests. The samples were heated at a rate of 10° C. per minute from ambient temperature to 250° C. The melting of the sugars was accompanied by decomposition. The melting/decomposition endotherms were recorded. The lowest temperature on the endotherm was measured as the onset temperature. The onset temperatures obtained also are set forth in Table 1.

TABLE 1

Enhancement factors of coated substrates from Examples 1–4 and the onset temperatures of sugars.

| Sugar | Onset Temp. (° C.) | Enhancement Factor | Example No. |
|---|---|---|---|
| Maltose | 122 | 1.48 | 1 |
| Fructose | 131 | 1.62 | 2 |
| Glucose | 167 | 1.18 | 3 |
| Sucrose | 191 | 0 | 4 |

The results set forth in Table 1 demonstrate that sugars having lower onset temperatures showed higher enhancement factors. Coatings containing sugars having high onset temperatures such as sucrose would require a higher temperature or a longer heating time to produce sufficient contrast. Thus, a greater laser power or a longer residence time would be required.

EXAMPLE 6

This Example illustrates the use of a sugar containing natural product in the coating composition of the present invention. This Example further illustrates the effect of the heating time on the enhancement factor.

2.5 grams of HONEY BEAR™ honey, Honey Acres, Ashippun, Wis., were thoroughly mixed with 7.5 grams of the JONCRYL 70 resin solution. The resulting coating composition was applied onto pre-cleaned aluminum plates by using a film applicator (BYK Gardner, Inc., Silver Spring, Md.). A 200 micron film of the coating composition was applied onto the substrates. The coated substrates were then heated in an oven at 200° C. for varying lengths of time. The color intensities of the dried films were measured before and after exposure to heat on the Macbeth Model RD 918 densitometer. The results obtained are set forth in Table 2.

TABLE 2

Enhancement Factor as a function of the time of heat exposure.

| Exposure (min) | Enhancement in color density |
|---|---|
| 0.00 | 0 |
| 1.0 | 1.05 |
| 2.0 | 1.29 |
| 3.0 | 1.69 |

The results set forth in Table 2 show that the enhancement in color density is proportion al to the time of heat exposure. Thus, to produce a darker image, the coating has to be exposed to heat for a longer period of time. In laser marking, however, the time required to create a mark can be significantly reduced by a suitable choice of the power level.

EXAMPLE 7

This Example illustrates the preparation of an embodiment of the present invention involving a non-aqueous system. With stirring, 5 grams of honey were added to 10 grams of the S-100 varnish. The varnish contained boiled linseed oil. The resulting coating composition was applied onto a 20 lb. weight photocopying paper using a BYK Gardner film applicator to a thickness of 100 microns. The coated substrate was heated in an oven at 200° C. for 2 minutes to obtain sample A. A control coating composition and a coated substrate (sample B) were prepared as above except that the honey was omitted from the composition. The color intensities of the coated substrates were measured on a densitometer. The color densities of samples A and B were 0.56 and 0.25, respectively. The results obtained confirmed that a coating composition involving a non-aqueous system responded to heat.

EXAMPLE 8

This Example illustrates a method of marking coated substrates. A coating composition containing 5 grams of honey, 2 grams of sodium silicate, and 3 grams of water was prepared and applied onto a white coated paper (Premium Display Media-120 gram, Raster Graphics, San Jose, Calif.). The coating wet thickness was 50 microns. The coating was dried to remove the water. The coating was then irradiated with a carbon dioxide power laser (LASERPRO™ DM, Videojet Systems International, Inc., Wood Dale, Ill.). The average power of the laser was 100 watt. Marks were made at various speeds. The marks and the speed of marking are depicted in FIG. 1. The marks had good color intensity.

The reference cited herein is hereby incorporated by reference in their entirety.

While this invention has been described with an emphasis upon certain embodiments, it will be obvious to those of ordinary skill in the art that variations of the embodiments may be used and that it is intended that the invention may be practiced otherwise than as specifically described herein. Accordingly, this invention includes all modifications encompassed within the spirit and scope of the invention as defined by the following claims.

What is claimed is:

1. A transparent coating comprising a resin and a heat responsive material that increases in opacity when exposed to heat.

2. The transparent coating of claim 1, which is substantially free of a pigment or dye.

3. The transparent coating of claim 2, wherein said heat responsive material becomes colored as a result of a chemical reaction that occurs when exposed to heat.

4. The transparent coating of claim 3, wherein said chemical reaction is decomposition.

5. The transparent coating of claim 4, wherein said heat responsive material becomes brown or black when exposed to heat.

6. The transparent coating of claim 5, wherein said heat responsive material is a carbohydrate.

7. The transparent coating of claim 6, wherein said carbohydrate is a sugar or sugar derivative.

8. The transparent coating of claim 7, wherein said sugar or sugar derivative undergoes decomposition at a temperature of from about 50° C. to about 250° C.

9. The transparent coating of claim 7, wherein said sugar is selected from the group consisting of monosaccharides and disaccharides.

10. The transparent coating of claim 7, wherein said sugar or sugar derivative is selected from the group consisting of fructose, glucose, mannitol, sucrose, galactose, and maltose.

11. The transparent coating of claim 1, wherein said resin is water soluble.

12. The transparent coating of claim 11, wherein said resin is selected from the group consisting of silicate resins, acrylic resins, urethane resins, anionic resins, and cationic resins.

13. The transparent coating of claim 11, wherein said resin is selected from the group consisting of sodium silicate, polyacrylic acid, acrylic copolymers, polyurethanes, polystyrene sulfonate, and polyallylammonium chloride.

14. The transparent coating of claim 1, further including an energy transfer agent.

15. A coating composition comprising a solvent, a resin, and a heat responsive material that increases in opacity when exposed to heat, wherein said coating composition is capable of forming a transparent coating.

16. The coating composition of claim 15, which is free or substantially free of a pigment or dye.

17. The coating composition of claim 16, wherein said heat responsive material becomes colored as a result of a chemical reaction that occurs when exposed to heat.

18. The coating composition of claim 17, wherein said chemical reaction is decomposition.

19. The coating composition of claim 18, wherein said heat responsive material becomes brown or black when exposed to heat.

20. The coating composition of claim 19, wherein said heat responsive material is a carbohydrate.

21. The coating composition of claim 20, wherein said carbohydrate is a sugar or sugar derivative.

22. The coating composition of claim 21, wherein said sugar or sugar derivative undergoes decomposition at a temperature of from about 50° C. to about 250° C.

23. The coating composition of claim 21, wherein said sugar is selected from the group consisting of monosaccharides and disaccharides.

24. The coating composition of claim 21, wherein said sugar or sugar derivative is selected from the group consisting of fructose, glucose, mannitol, sucrose, galactose, and maltose.

25. The coating composition of claim 15, wherein said solvent is water.

26. The coating composition of claim 15, wherein said resin is water soluble.

27. The coating composition of claim 26, wherein said resin is selected from the group consisting of silicate resins, acrylic resins, urethane resins, anionic resins, and cationic resins.

28. The coating composition of claim 26, wherein said resin is selected from the group consisting of sodium silicate, polyacrylic acid, acrylic copolymers, polyurethane, polystyrene sulfonate, and polyallylammonium chloride.

29. The coating composition of claim 15, further including an energy transfer agent.

30. A method for creating a mark on a substrate comprising preparing a coated substrate by providing a coating of claim 1 and exposing to heat a selected area of the coated substrate.

31. The method of claim 30, wherein said heat is provided by a laser.

32. A method for creating a mark on a substrate comprising preparing a coated substrate by coating the substrate with the coating composition of claim 15 and exposing to heat a selected area of the coated substrate.

33. The method of claim 32, wherein said heat is provided by a laser.

34. A transparent coating comprising a resin and a heat responsive material that increases in opacity when exposed to heat, wherein the heat responsive material is a sugar or sugar derivative.

35. A coating composition comprising a solvent, a resin, and a sugar or sugar derivative that increases in opacity when exposed to heat, wherein said coating composition is capable of forming a transparent coating.

36. A method for creating a mark on a substrate comprising preparing a coated substrate by providing a coating of claim 34 and exposing to heat a selected area of the coated substrate.

37. The method of claim 36, wherein said heat is provided by a laser.

38. A method for creating a mark on a substrate comprising preparing a coated substrate by coating the substrate with the coating composition of claim 35 and exposing to heat a selected area of the coated substrate.

39. The method of claim 38, wherein the heat is provided by a laser.

* * * * *

UNITED STATES PATENT AND TRADEMARK OFFICE
CERTIFICATE OF CORRECTION

PATENT NO. : 6,210,472 B1
DATED : April 3, 2001
INVENTOR(S) : Kwan et al.

Page 1 of 1

It is certified that error appears in the above-identified patent and that said Letters Patent is hereby corrected as shown below:

<u>Title page,</u>
Item [56] References Cited,

U. S. PATENT DOCUMENTS

| Please add | -- 4,880,466 | 11/1989 | Zwarun et al., -- |
|---|---|---|---|
| | -- 5,662,731 | 9/1997 | Andersen et al., -- |
| | -- 5,679,145 | 10/1997 | Andersen et al., -- |
| | -- 5,821,286 | 10/1998 | Xu et al., -- |
| | -- 5,868,824 | 2/1999 | Andersen et al., -- |
| | -- 5,990,199 | 11/1999 | Bealing et al., -- |

<u>Column 7,</u>
Line 51, change "proportion al" to -- proportional --.

Signed and Sealed this

Twenty-sixth Day of February, 2002

Attest:

Attesting Officer

JAMES E. ROGAN
Director of the United States Patent and Trademark Office